United States Patent [19]

Grot

[11] 3,985,501

[45] Oct. 12, 1976

[54] ION-EXCHANGE FABRIC OF FLUORINATED POLYMER CONTAINING PENDANT SIDE CHAINS WITH SULFONYL GROUPS

[75] Inventor: Walther Gustav Grot, Chadds Ford, Pa.

[73] Assignee: E. I. Du Pont de Nemours and Company, Wilmington, Del.

[22] Filed: Jan. 4, 1974

[21] Appl. No.: 430,754

[52] U.S. Cl. .............................. 8/115.5; 57/140 R; 139/420 R; 260/2.2 R; 260/79.3 MU
[51] Int. Cl.² ........................................ D06M 11/14
[58] Field of Search ................ 8/115.5; 260/2.2 R, 260/79.3 MU; 139/420 R; 57/140 R

[56] References Cited
UNITED STATES PATENTS

| | | | |
|---|---|---|---|
| 3,718,627 | 2/1973 | Grot | 260/2.2 R |
| 3,835,072 | 9/1974 | Economy et al. | 260/2.1 C |

*Primary Examiner*—Wilbert J. Briggs, Sr.

[57] ABSTRACT

A woven fibrous ion-exchange fabric is initially formed from fibers as in the form of threads, ropes or yarns which comprise a fluorinated polymer with sulfonyl-containing pendant side chains in the $-SO_2X$ form wherein X is fluorine or chlorine. Conversion of the sulfonyl group in the polymer to ionic form causes longitudinal shrinkage of the fiber in the woven fabric and lateral fiber swelling thereby forming an essentially impermeable fabric to physical flow of liquid through spaces between the fibers. High strength is realized in the woven fabric without a need for reinforcing material.

3 Claims, No Drawings

ION-EXCHANGE FABRIC OF FLUORINATED POLYMER CONTAINING PENDANT SIDE CHAINS WITH SULFONYL GROUPS

BACKGROUND OF THE INVENTION

Fluorinated polymers with pendant side chains containing groups such as sulfonamide and sulfonic acid are known in the prior art and possess utility as ion-exchange resins. The resins are useful in the form of films wherein it is necessary to have thermal and chemical stability such as for use as a membrane in an environment of a electrolytic chlor-alkali cell. An example of such utility is disclosed in U.S. Pat. No. 2,251,660, published Apr. 26, 1973.

A serious limitation of use of such ion-exchange resins in the form of films is that physical strength of the film is unduly low for specific applications. Additionally, a tear or perforation in a film may quickly progress in length as is characteristic of many films. Therefore, an initial perforation in the film renders the film quickly unfit and undesirable for its intended usage. Use of a greater film thickness for increased physical strength denotes greater expense as well as in many instances reduced conductivity for ion-exchange purposes.

SUMMARY OF THE INVENTION

The present invention is directed to formation of a tightly woven fibrous intermediate fabric formed from threads, ropes or yarns of a fluorinated polymer containing pendant side chains in —$SO_2X$ form wherein X represents fluorine or chlorine and preferably fluorine. Thereafter, conversion of the sulfonyl groups of the polymer to the ionic form takes place wherein swelling of the fibers takes place causing the tightly woven construction of the final desired product.

The use of a woven fabric overcomes deficiencies in lack of strength in susceptibility to tears or perforations compared to the use of ion-exchange materials in the form of films. Additionally, use of a tightly woven fabric overcomes a need of a reinforcing fabric encapsulated in the film which is disclosed in U.S. Pat. No. 3,770,567.

The intermediate fluorinated fabric with sulfonyl groups in the —$SO_2X$ form with X fluorine or chlorine and preferably fluorine is converted to the ionic form such as sulfonic acid, sulfonamide or salts thereof by known conversion techniques.

DETAILED DESCRIPTION OF THE INVENTION

A fluorinated polymer with terminal sulfonyl groups present in the —$SO_2X$ form with X representing fluorine or chlorine and preferably fluorine represents the starting polymer which is formed into fibers for weaving into a fabric. This type of polymer is melt processible, i.e., it can be extruded and worked by the application of elevated temperature.

As employed herein, fluorinated polymer denotes a polymer with a backbone fluorocarbon chain which has sulfonyl groups attached either directly to a main fluorocarbon chain of the polymer or to a fluorocarbon side chain attached to a main chain, and where either the main chain or a side chain may contain ether oxygen atoms. The fibers prior to weaving into a cloth are in the form of an intermediate polymer which does not act as an ion-exchange polymer.

The intermediate polymers are prepared from monomers which are fluorine substituted vinyl compounds. The polymers are made from at least two monomers with at least one of the monomers coming from each of the two groups described below. The first group comprises fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof.

The second group is the sulfonyl containing monomers containing the precursor —$SO_2F$ or —$SO_2Cl$. One example of such a comonomer is $CF_2$=$CFSO_2F$. Additional examples can be represented by the generic formula $CF_2$=$CFR_fSO_2F$ wherein $R_f$ is a bifunctional perfluorinated radical comprising 2 to 8 carbon atoms. The particular chemical content or structure of the radical linking the sulfonyl group to the copolymer chain is not critical and may have fluorine, chlorine or hydrogen atoms attached to the carbon atom to which is attached the sulfonyl group. If the sulfonyl group is attached directly to the chain, the carbon in the chain to which it is attached must have a fluorine atom attached to it. The $R_f$ radical of the formula above can be either branched or unbranched, i.e., straight chained and can have one or more ether linkages. It is preferred that the vinyl radical in this group of sulfonyl fluoride containing comonomers be joined to the $R_f$ group through an ether linkage, i.e., that the comonomer be of the formula $CF_2$=$CFOR_fSO_2F$. Illustrative of such sulfonyl fluoride containing comonomers are

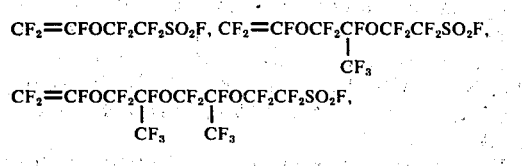

$CF_2$=$CFCF_2CF_2SO_2F$, and

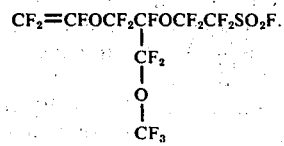

The most preferred sulfonyl fluoride containing comonomer is perfluoro(3,5-dioxa-4-methyl-7-octenesulfonyl fluoride),

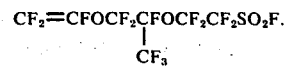

The sulfonyl containing monomers are disclosed in such references as U.S. Pat. No. 3,282,875 to Connolly et al. and U.S. Pat. No. 3,041,317 to Gibbs et al. and in U.S. Pat. No. 3,718,627 to Grot and in U.S. Pat. No. 3,560,568 to Resnick.

The preferred intermediate copolymers are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7- octenesulfonyl fluoride) which comprises 10 to 60 percent, preferably, 25 to 50 percent by weight of the latter.

The intermediate copolymer is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, issued to H. H. Gibbs and R. N. Griffin on June 26, 1962; that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range of 0°–200° C. and at pressures in the range 1–200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene, and the like.

Aqueous techniques for preparing the intermediate copolymer include contacting the monomers with an aqueous medium containing a free-radical initiator to obtain a slurry of polymer particles or a non-water-wet or granular form, as disclosed in U.S. Pat. No. 2,393,967, issued to M. M. Brubaker on Feb. 5, 1946; contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752, issued to K. L. Berry on July 10, 1951, and U.S. Pat. No. 2,593,583 issued to J. F. Lontz on Apr. 22, 1952.

The intermediate polymers are formed into fibers by conventional technique such as extrusion melt spinning. Such extrusion melt spinning is well known in the prior art and conventional techniques are suitable in the present case. In such melt spinning operations, an increase in length during the drawing operation occurs such as of the order of 50 percent to 400 percent wherein the diameter is reduced. By this fashion, an oriented thread, rope or yarn is obtained in the drawing operation.

Thereafter, the thread, rope or yarn is formed into the fabric by weaving followed by conversion of the polymer to the ionic form. It is essential in the desired utility for the final polymer that the fabric or cloth be essentially impermeable to physical passage of liquids between the fabric strands. Water will swell the polymer and will diffuse directly through the polymer in ionic form. However, the construction of the final fabric minimizes passage between the interstices of the fabric of undesired components, e.g., salt passage into caustic in formation of caustic and chlorine from a brine solution.

As employed herein, essentially impermeable denotes the ability of the woven fabric to pass at most a limited quantity of water. More specifically, the term denotes the passage of less than 100 ml of water through a square inch of fabric exposed to a vertical head of 19 inches of water during a 60-hour time period. The fabric is preconditioned prior to the test procedure by soaking in boiling water for one-half hour.

Upon conversion to the final polymer, shrinkage of the fiber takes place in the longitudinal direction while swelling of the fiber occurs along its width which causes the impermeability of the final woven fabric.

For the purposes of explanation only, it is considered that the final polymer in ionic form has a memory, compared to the individual threads, ropes and yarns formed from the intermediate fabric. In other words, in the melt spinning in a drawing operation, an increase in the length of the thread, rope or yarn takes place with a decrease in the diameter of this intermediate polymer form. It is considered upon conversion of the polymer to ionic form that the polymer remembers its original dimensions before the drawing operation and attempts to return to this state. The polymer shrinks along its longitudinal direction but in contrast swells along the fiber diameter. For all practical purposes, the volume of the thread, rope or yarn does not change greatly, if at all, but the physical volume is redistributed and swelling along the width denotes that the fiber is thicker in the final woven fabric. Therefore, the physical property of the final fabric of essential impermeability to the flow of liquids is realized, and the important utility of the invention is obtained wherein high strength is obtained in comparison to films of the polymer per se.

The individual thickness of the fiber comprising a thread, rope or yarn may vary widely which thickness is not critical to the present invention. However, for illustrative purposes in the form of a thread a diameter of the order of 0.05 to 10 mils may be employed. A more preferred range will be of the order of 0.75 to 4 mils.

As previously discussed, the intermediate polymer formed into fibers comprising threads, ropes or yarns is woven into a fabric prior to conversion of the polymer to ionic form. The woven fabric possesses high strength in relationship to the polymer film. Also in conjunction with this high strength, the individual threads, ropes or yarns will resist a tendency to tear as contrasted to a polymer in the film form.

However, it is within the scope of this disclosure to employ a high-strength reinforcing material. Since in most instances, this high-strength reinforcing fabric will have different shrinkage and swelling rates than the intermediate and final polymer, the reinforcing material will only cross the fabric in one direction only. These high-strength fibers must be able to withstand the treatment conditions necessary to convert the intermediate polymer to the final polymer in its ionic form. Useful high-strength materials include quartz, glass, polytetrafluoroethylene and tetrafluoroethylene/hexafluoropropylene. The thickness of these reinforcing strands may vary within wide ranges and will be determined in part by the diameter of the thread, rope or tow employed in the woven fabric. However, illustratively, the thickness of the reinforcing material may be essentially of the same thickness as the fiber.

Generally, a reinforcing material will not be employed for optimum efficiency in use of the ion exchange fabric. Illustratively, a reinforcing material tends to reduce to a substantial degree the conductivity of the fabric.

Upon weaving of the fabric wherein the polymers are in the intermediate form, the conversion of this intermediate polymer to the final polymer is undertaken by conversion of the sulfonyl groups in the —SO$_2$X form, wherein X has been previously defined.

The sulfonyl groups of the intermediate polymer are converted from the —$SO_2X$ form to the form of —($SO_2NH)_mQ$, wherein Q is selected from the group consisting of H, cation of an alkali metal and cation of an alkaline earth metal and $m$ is the valence of Q or to the form of —$(SO_3)_nMe$, wherein Me is a metallic cation, H, or $NH_4$ and n is the valence of Me.

In the above definition, preferred members include cations of alkali metals such as sodium or potassium.

For conversion of the intermediate sulfonyl groups to the —$(SO_2NH)_mQ$ form wherein Q is H, contact is undertaken with anhydrous ammonia in liquid or gaseous form. Conversion to Q as a cation of an alkali metal or alkaline earth metal may be undertaken by contact with the hydroxide of the cation of the alkali metal or cation of the alkaline earth metal.

Illustratively, conversion of the —$SO_2F$ groups to —$SO_2NH_2$ may take place by contact with anhydrous ammonia which can be in the gaseous form, the liquid form, as a mixture with air or other gases which will not react with the sulfonyl group or the remaining portion of the polymer or ammonia in a solvent which is nonaqueous and which is nonreactive with the polymer.

To convert the sulfonyl groups in —$SO_2X$ form to —$(SO_3)_nMe$ form, the intermediate polymer may be contacted with a hydroxide of the metallic cation such as sodium hydroxide. In specific instances of Me, it may be necessary to form —$SO_3Na$ by reaction with sodium hydroxide followed by ion exchange with a solution of the salt of the desired Me.

Suitable disclosures of conversion from the intermediate to the final polymer are set forth in U.S. Pat. No. 3,282,875 and U.S. Pat. No. 3,770,567.

After conversion of the intermediate polymer to its final ionic form, the woven fabric may be directly employed for its intended utility. Illustratively, the woven fabric may be employed in place of the membrane film which is directly disclosed in U.S. Pat. No. 2,251,660, published Apr. 26, 1973.

To further illustrate the innovative aspects of the present invention, the following example is provided.

EXAMPLE

The yarn was obtained by spinning the copolymer by extrusion at a temperature of 280° C. downward through a 13 hole spinneret with a take off speed of 250 yards per minute. The yarn was then drawn at a rate of 1000 yards per minute over a pipe heated to about 150° C. resulting in a 300% elongation. The yarn bundle thus obtained had a thickness of about 2.5 mils while the 13 individual fibers have a thickness of 0.7 mils. For the subsequent weaving, two and three strands of this yarn respectively were plied together with 3 twists per inch.

Thereafter, the yarn was woven into a 2 × 2 twill pattern wherein the warp consisted of 90 threads per inch, each thread containing 26 filaments of 0.7 mil diameter with 3 twists per inch. The fill consisted of 70 threads per inch wherein each thread contained 39 filaments of 0.7 mil diameter with 3 twists per inch. The fabric in intermediate form was converted to the $SO_3Na$ form by treating with a 10 percent solution of sodium hydroxide at 90° C. for 6 hours. In this process, a shrinkage of approximately 20 percent was observed in the length with a shrinkage of approximately 15 percent across its width. At the same time the thickness of the fabric is increased by about 25 percent.

Microscopic examination revealed that the fabric was of a tight woven construction, and the impermeableness of the fabric to physical flow of liquid was measured in the following fashion: a one-square-inch sample was placed in a horizontal position under a head of a 19-inch column of water. After a 63-hour period, 58 milliliters of water had passed through the one-inch-square sample, and during an additional 53-hour period an additional 7 mls of water had passed through.

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. A woven fabric comprising fibers of a fluorinated polymer containing sulfonyl groups which are attached to carbon atoms which have at least one fluorine atom attached thereto wherein a majority of the sulfonyl groups are in the —$(SO_2NH)_mQ$ or —$(SO_3)_nMe$ form with Q selected from the group consisting of H, cation of an alkali metal and cation of an alkaline earth metal, m is the valence of Q, Me is a metallic cation, H, or $NH_4$ and $n$ is the valence of Me, said fabric having the ability to pass less than 100 ml of water through a square inch of fabric exposed to a vertical head of 19 inches of water during a 60-hour time period.

2. The fabric of claim 1 wherein Q is H.

3. The fabric of claim 1 wherein Me is sodium or potassium.

* * * * *